United States Patent [19]

Eschermann et al.

[11] Patent Number: 4,701,067

[45] Date of Patent: Oct. 20, 1987

[54] DEVICE FOR SNAP FITTING AN ELECTRIC APPARATUS ONTO A SUPPORT BAR

[75] Inventors: Guy Eschermann, Quetigny; Pierre Lemarquand, Velars sur Ouche, both of France

[73] Assignee: La Telemecanique Electrique, France

[21] Appl. No.: 927,479

[22] Filed: Nov. 6, 1986

[30] Foreign Application Priority Data

Nov. 7, 1985 [FR] France ................................ 85 16485

[51] Int. Cl.4 .......................... B25G 3/18; F16B 21/00
[52] U.S. Cl. ..................................... 403/326; 403/331
[58] Field of Search ............... 403/326, 329, 327, 331; 279/29, 79, 104

[56] References Cited

U.S. PATENT DOCUMENTS 2,795,034  6/1957  Forgette ......................... 279/104 X
4,422,212 12/1983  Sheiman et al. ................. 403/329 X

FOREIGN PATENT DOCUMENTS 1348182  3/1974  United Kingdom ................ 403/329

Primary Examiner—Andrew V. Kundrat
Attorney, Agent, or Firm—William A. Drucker

[57] ABSTRACT

A device is provided for snap fitting an electric apparatus on a support bar comprising, in a case, a housing containing a blade spring and opening into a groove in which one of the edges of the support bar may be engaged against the action of the blade spring. This latter is disposed inside the housing so as to exert a transverse force on said edge and has, at its end situated towards the edge, at least one fastening step of a hardness greater than that of the bar.

4 Claims, 4 Drawing Figures

1

DEVICE FOR SNAP FITTING AN ELECTRIC APPARATUS ONTO A SUPPORT BAR

BACKGROUND OF THE INVENTION

1. Field of the Invention

The present invention relates to a device for snap fitting an electric apparatus onto a support bar having two opposite edges, this device including in a case a housing which contains a snap fit spring and which opens into a groove in which one of the edges of the bar may be engaged while urging the spring.

2. Description of the Prior Art

The patent FR No. 2 551 807 shows such a device in which the end of the spring is in direct contact with the edge of the bar when the apparatus is mounted thereon. The result is reliable fixing with a minimum of means.

It appears however desirable to make the fitting of the apparatus on the support bar more resistant, in particular to longitudinal sliding, without impairing the simplicity of the prior device mentioned.

The aim of the invention is then to provide a snap fit device of said type which is of great simplicity while providing better fixing and particularly increased resistance to sliding of the electric apparatus along its support bar.

SUMMARY OF THE INVENTION

According to the invention, in this device, the snap fit spring is formed by a blade spring arranged and adapted in the housing so as to be applied against the cooperating edge of the support bar while exerting a force substantially perpendicular to the face of said edge. Furthermore, the blade spring has, at its end situated towards the edge of the bar, at least one step for fastening on the bar, the surface of the blade having at least at the level of the step a hardness greater than that of the bar.

Resistance to sliding of the apparatus along the edge of the bar is thus increased because of the resilient bite provided by the step (the steps) formed at the end of the blade on the bar, whereas the snap fit device remains inexpensive and simple to fit because of the monobloc nature of the blade spring.

The fastening steps are preferably formed in an end facet of the blade spring substantially parallel to the face of the edge of the bar; this facet is joined to the rest of the blade by at least one convolution ensuring the desired resilient movement of the facet and the resilient application of the steps on said edge face, perpendicularly thereto.

The convolution may advantageously participate in guiding the blade spring in its housing during movement of said blade caused by fitting the apparatus on the bar or removing it.

The convolution may preferably form part of a meander of the blade spring connecting the end facet which includes the fastening steps to an opposite end face of the blade bearing against a wall of the housing; the meander is then connected to the bearing face through an offset part of the blade, this offset part maintaining a substantial volume of the housing disengaged.

The desired resilience is thus obtained while allowing an assembly screw or rivet of the case to be introduced in the disengaged volume of the housing.

BRIEF DESCRIPTION OF THE DRAWINGS

Other features and advantages of the invention will be clear from reading the following description, with reference to the accompanying drawings in which.

DESCRIPTION OF THE PREFERRED EMBODIMENT

Figure 1:
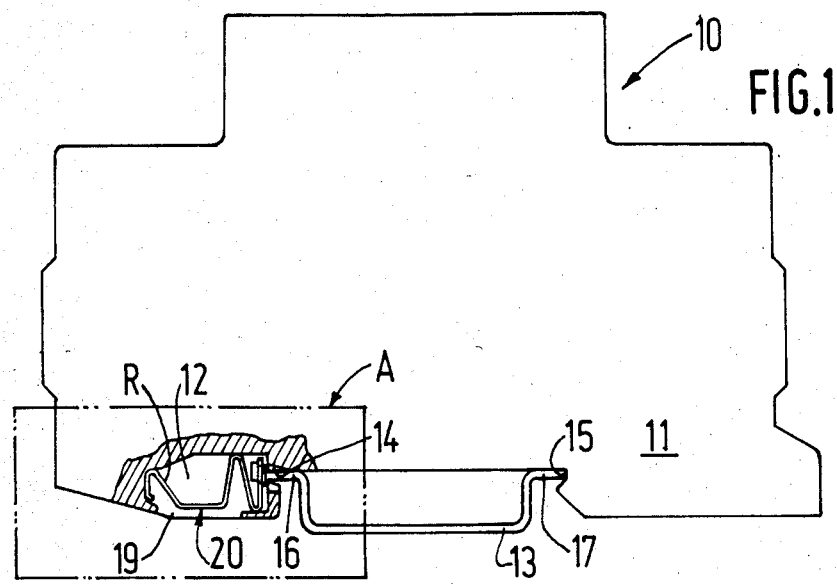
FIG. 1 shows in elevation an electric apparatus mounted on a capping bar by means of a snap fit device of the invention.
Figure 2:
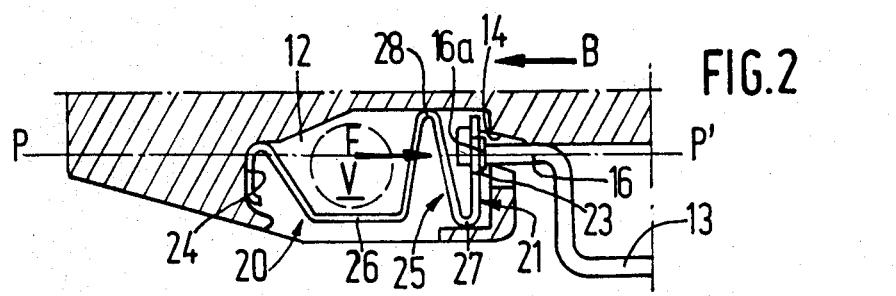
FIG. 2 shows on a larger scale the detail A of the apparatus of FIG. 1.

The electric apparatus 10 illustrated in FIG. 1 includes a case 11 towards the bottom of which is formed a housing 12 for a spring R. The apparatus 10 is intended to be mounted on a support bar of the capping type 13; it could of course be mounted in the same way on a C shaped bar on a perforated plate.

The case has two opposite grooves 14, 15 in which the edges 16, 17 of the flanges of the capping bar 13 may be engaged. Groove 14 opens into the housing 12 which in addition communicates with the outside through an opening 19.

Figure 3:
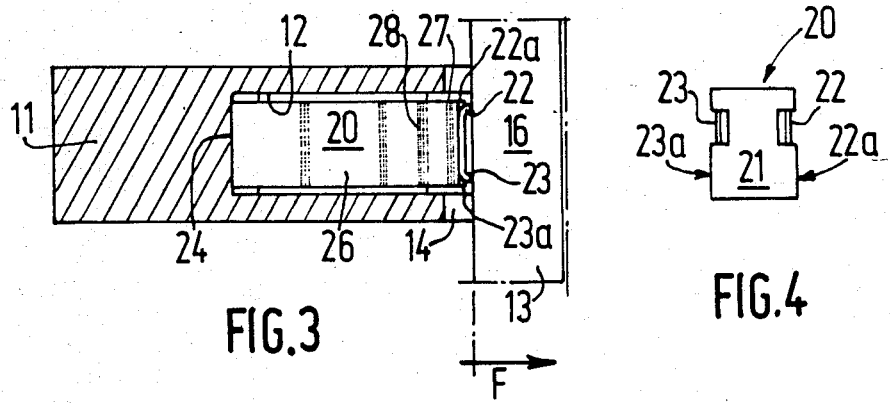
FIG. 3 shows a top view of the snap fit blade spring in its housing.
Figure 4:
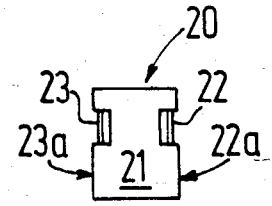
FIG. 4 is a front view of the blade spring taken in the direction shown by the arrow B in FIG. 2.

Spring R is, in accordance with the invention, a blade spring 20 having on the side of groove 14 a substantially vertical facet 21, that is to say parallel to the face 16a of the edge 16 of the bar 13 and perpendicular to the plane P—P' of the corresponding flange. The facet 21 has two oblique steps 22, 23 facing in opposite directions, obtained by cutting out the opposite edges 22a, 23a of the facet (FIGS. 3 and 4). On the side opposite groove 14, the blade spring 20 has a face 24 bearing against the bottom of housing 12.

To join the facet 21 and the bearing face 24 of the blade spring together, this later has a meander 25 and an offset web 26. This web leaves a substantial volume V of housing 12 free so as to allow for example the passage of an assembly screw or rivet of the case.

The meander 25 includes a first convolution 27 in the immediate vicinity of a lower wall of housing 12 and a second convolution 28 in the immediate vicinity of the upper wall of housing 12. The clearance between the convolutions and the walls of the housing is determined so as to provide the best compromise between satisfactory guiding and an absence of jamming of the blade spring in its housing.

Of course, the steps described may be more than two in number and may be formed by any method other than cutting out so as to cause the desired teeth or projections to appear.

The blade spring 20 is made from steel of a hardness greater than the steel of the rail, so that the steps penetrate slightly into the bar when the apparatus is mounted thereon. The lateral force to be exerted on the apparatus for causing it to slide on the bar is increased with respect to conventional embodiments and the fixing obtained is of a better quality.

What is claimed is:

1. The assembly of a case containing an electrical device and an elongate support member having first and second wings, said case having a wall surface portion which forms first and second cavities or slots respectively cooperating with the first and second wings for attachment of the case to the support member, wherein:
  (i) the first cavity is a slot which opens into an inner chamber of the case and the edge surface of the first wing projects through said slot into said chamber;
  (ii) a spring blade, housed in the chamber, has a first end surface portion which bears on the chamber surface and a second end surface portion substantially parallel to the edge surface of the first wing; said second end surface portion having at least a folded part which grips on the edge surface of the first wing, said folded part being made of a material harder than the material of the support member, said second end surface portion applying on the edge surface of the first wing a force directed substantially at right angles to said edge surface.

2. An assembly as claimed in claim 1, wherein said folded part includes two cut out portions projecting in oppositely inclined directions.

3. An assembly as claimed in claim 1, wherein the spring blade has at least one fold extending the second end surface portion, said fold engaging the chamber surface for guiding the spring blade along the chamber surface.

4. An assembly as claimed in claim 3, wherein the spring blade has an offset web extending the first end surface portion for keeping free a substantial portion of the chamber space.

* * * * *